July 30, 1963  R. E. RAYMOND  3,099,163
HYDRAULIC FUNCTION ANALYZER
Filed May 17, 1960  7 Sheets-Sheet 1
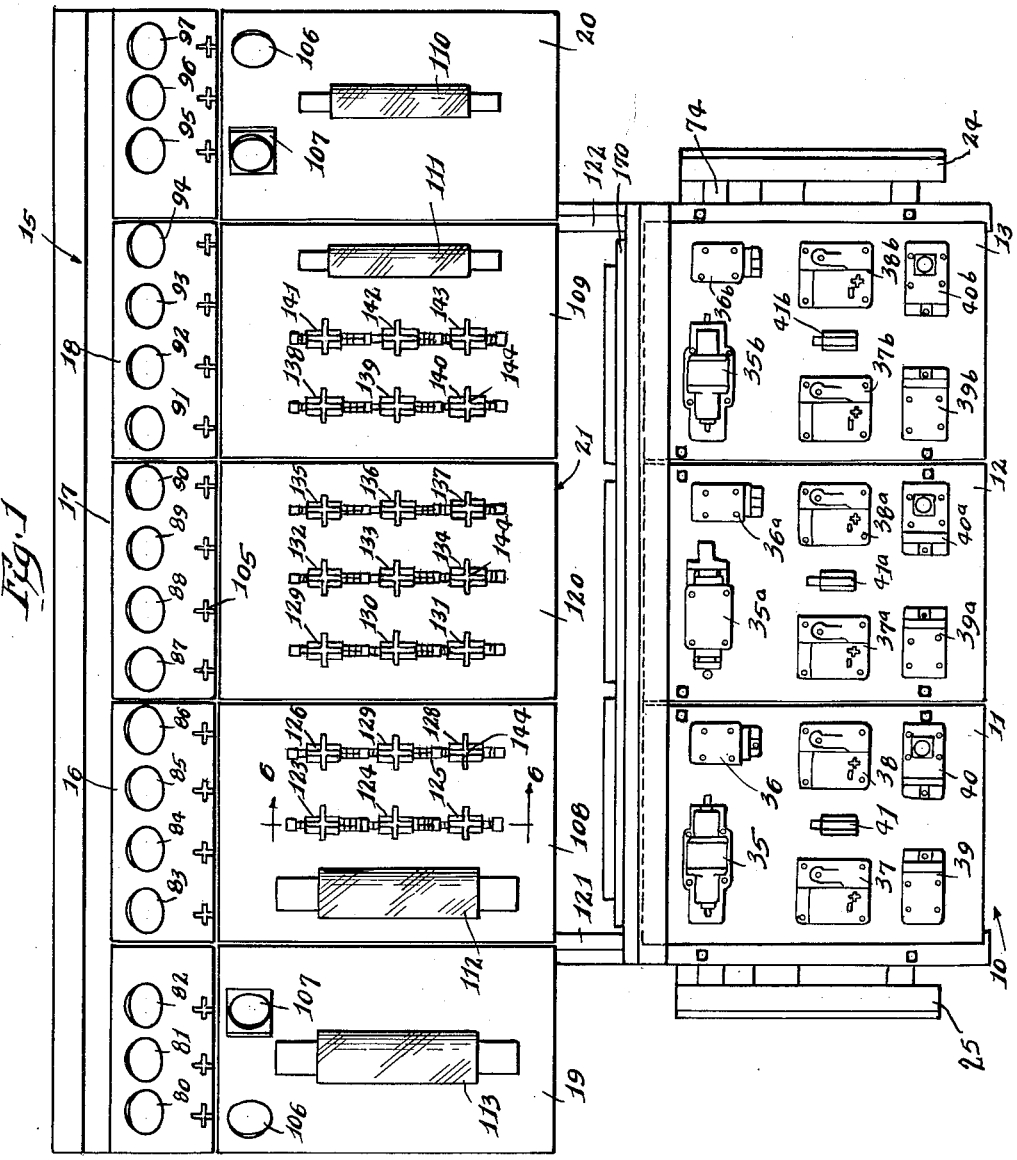
Inventor
Robert E. Raymond
By Hofgren, Brady,
Wegner, Allen & Stellman
Attorneys

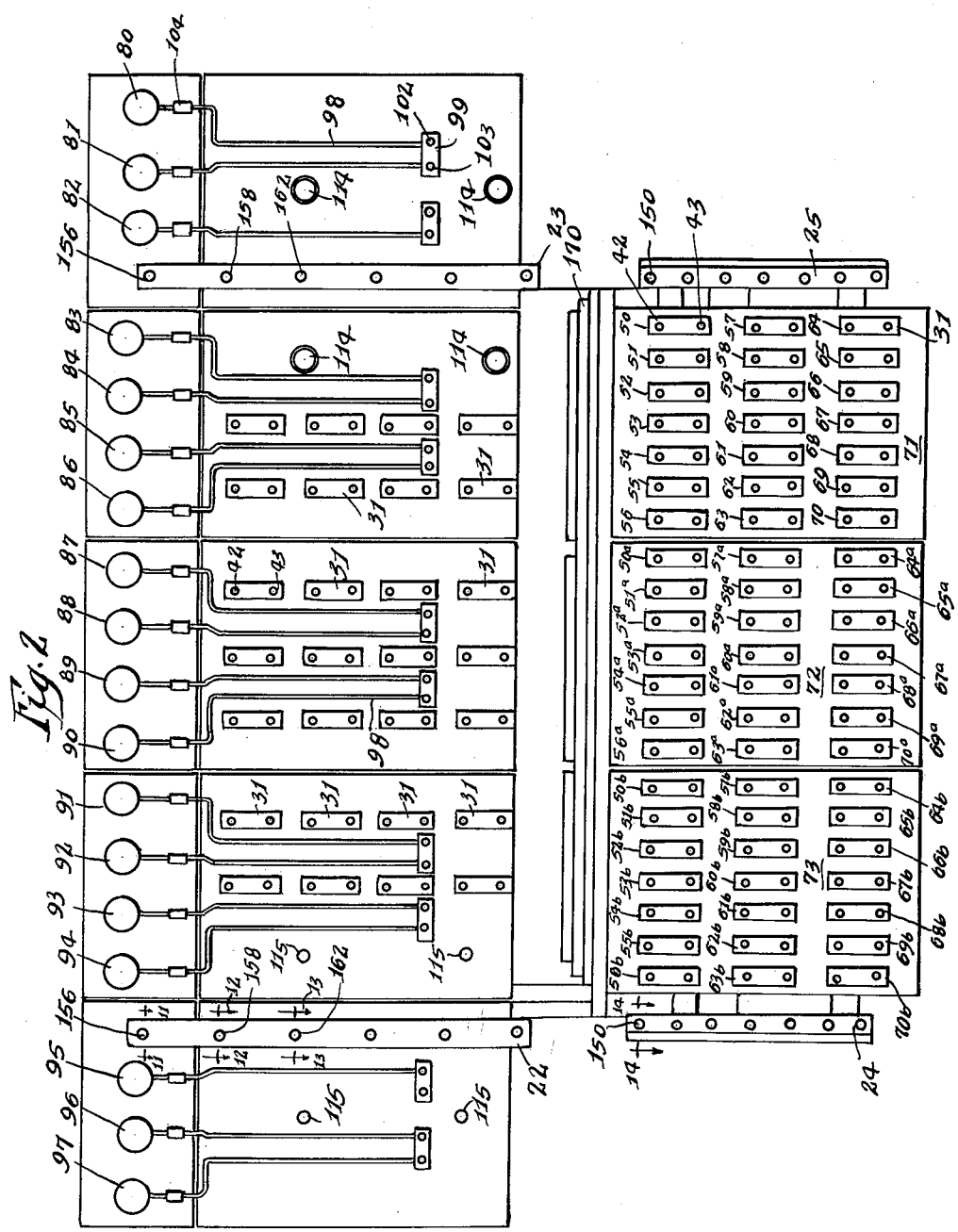

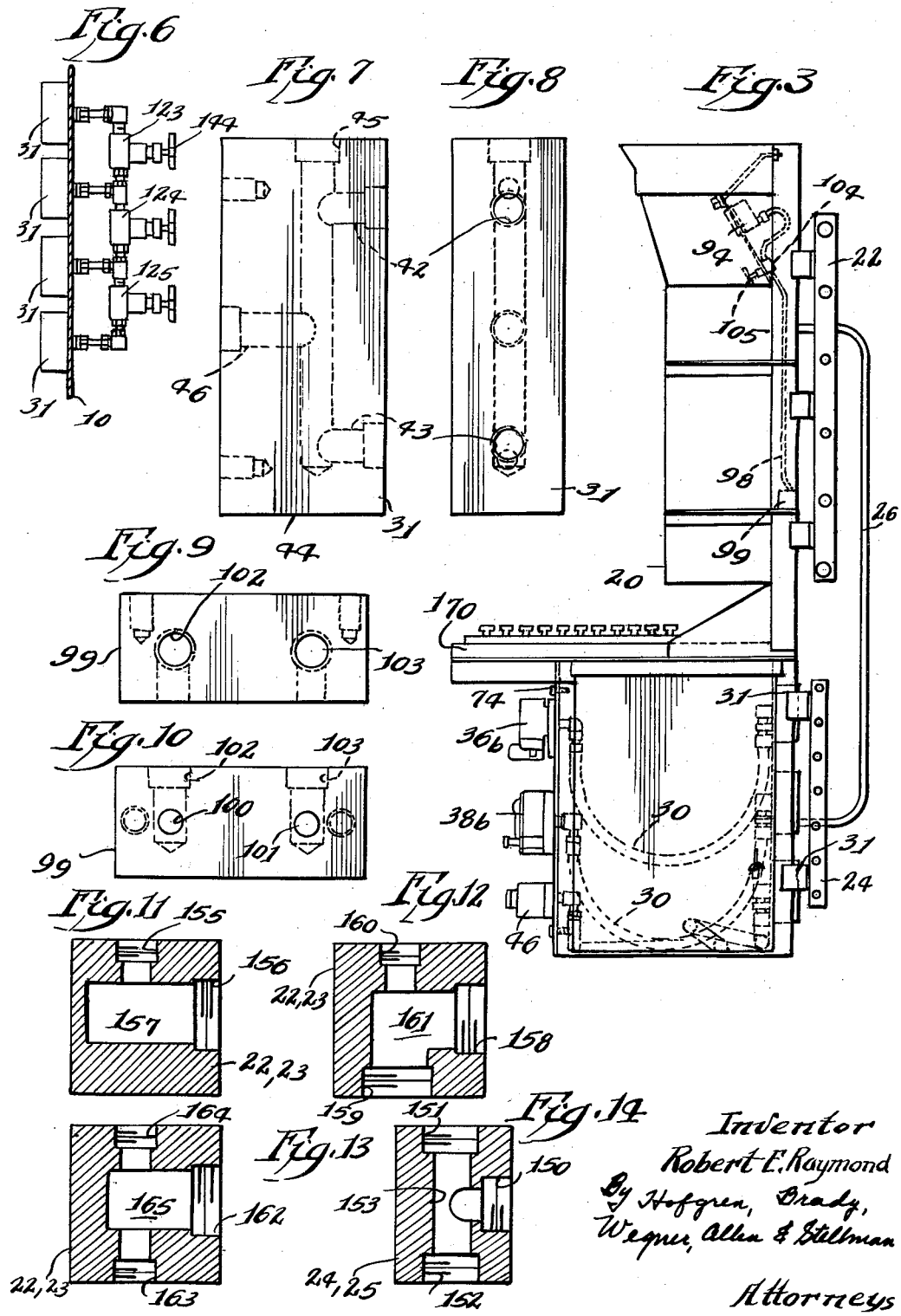

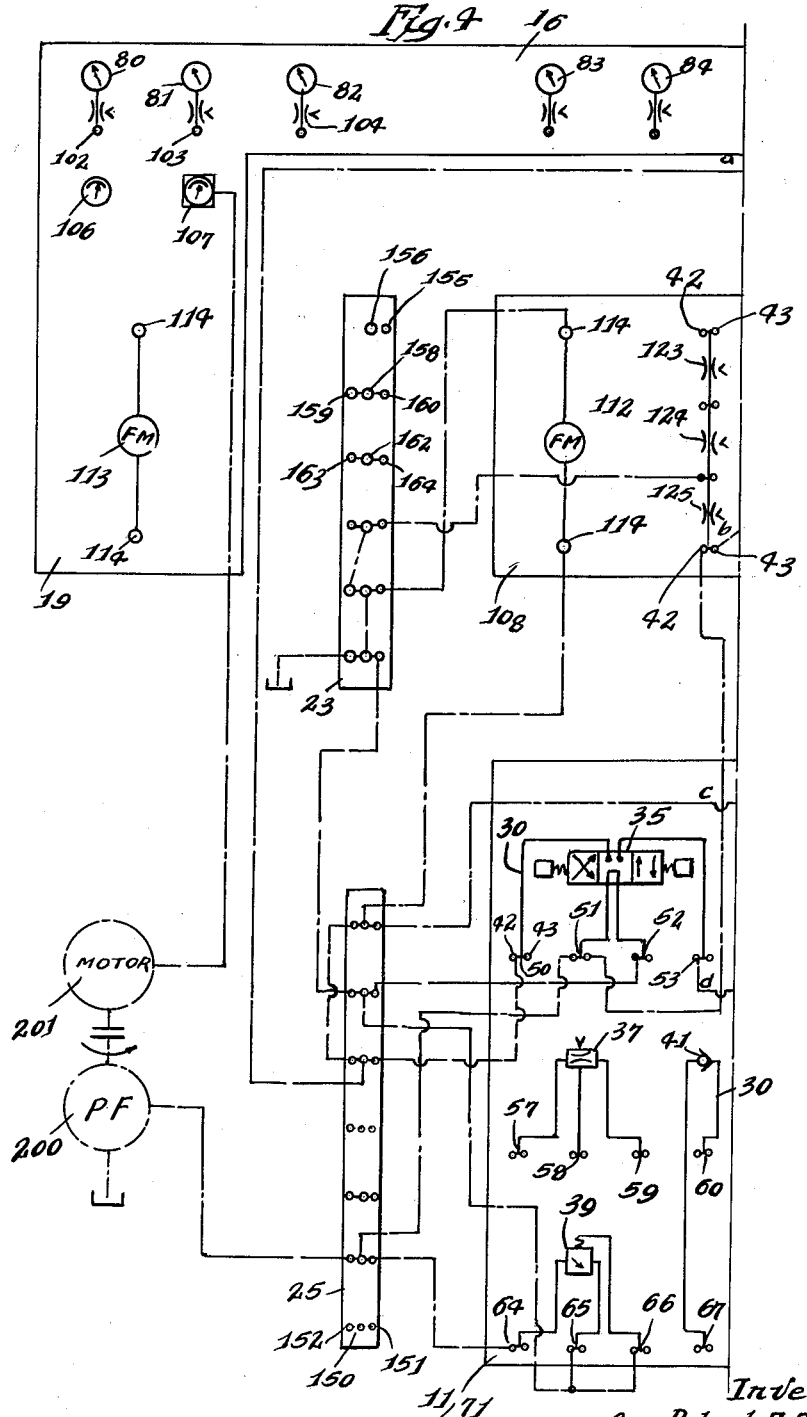

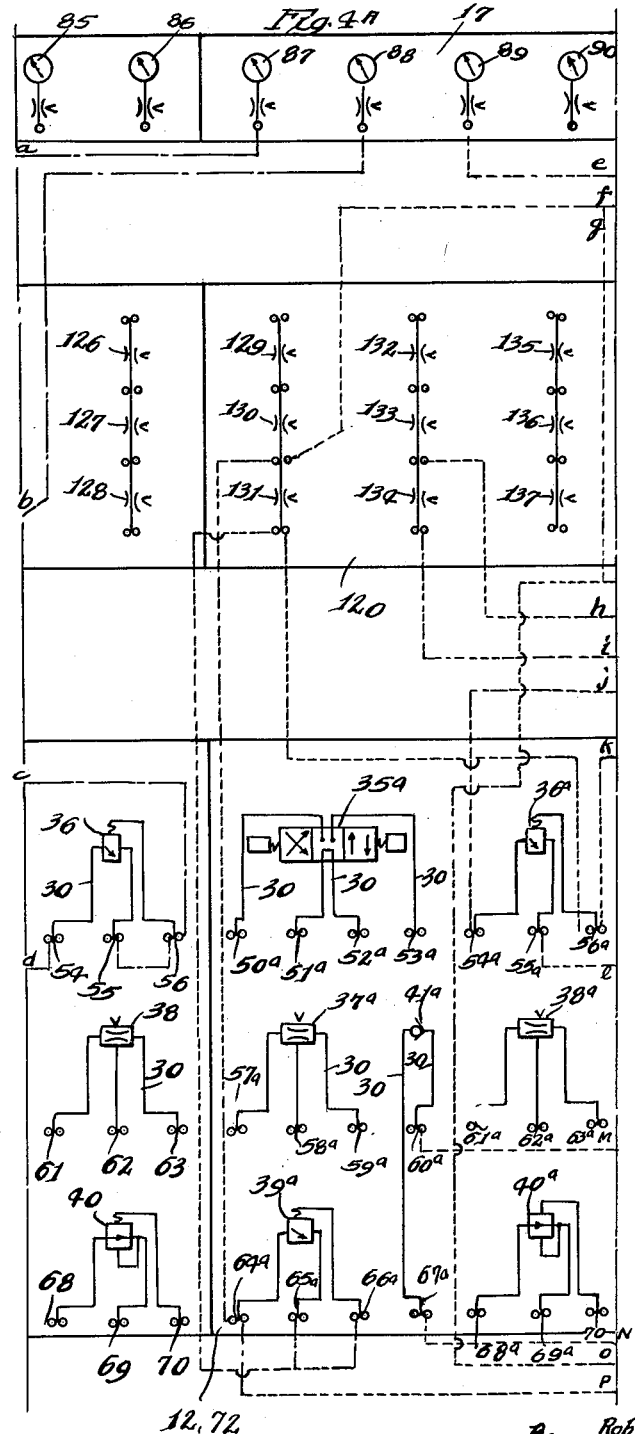

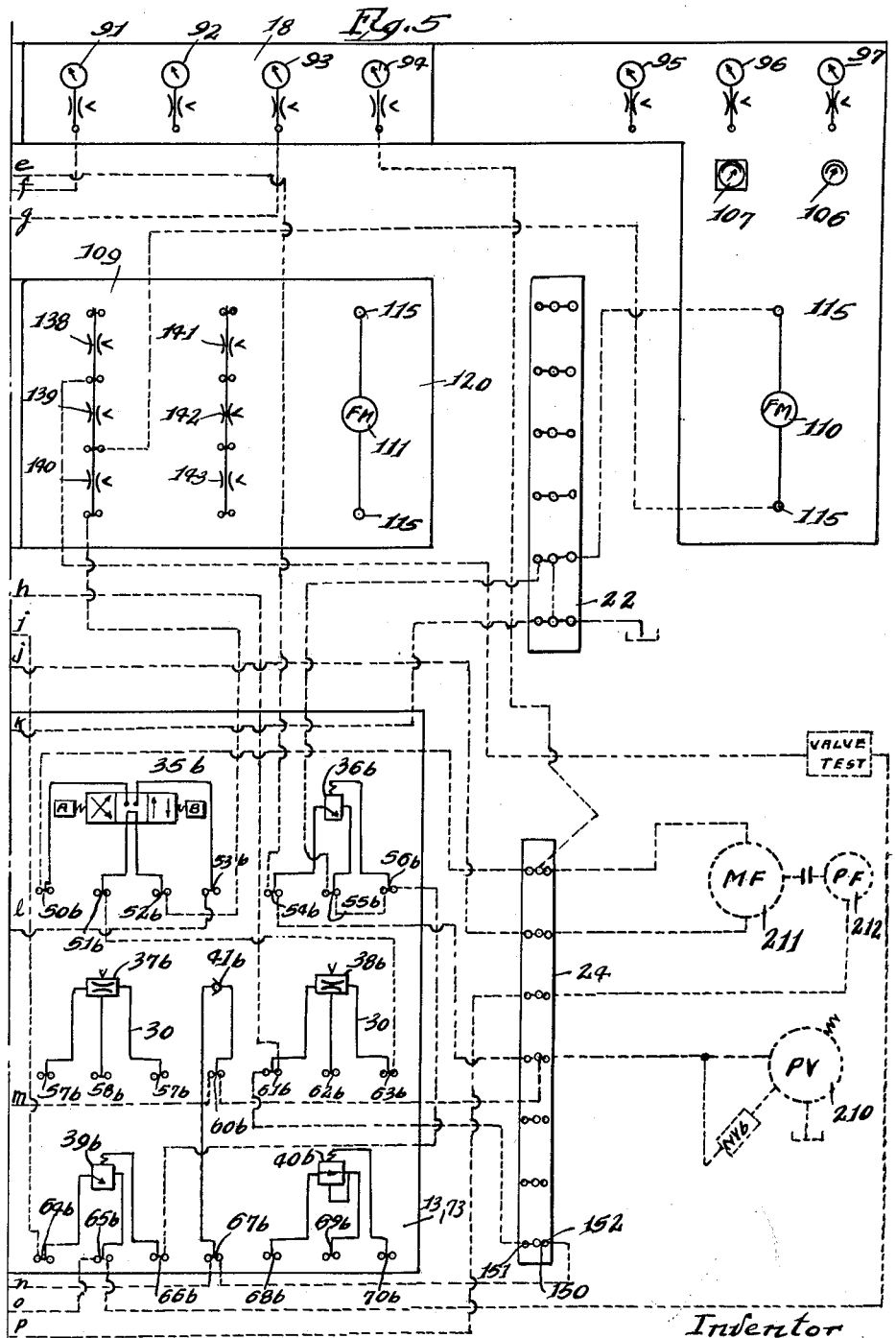

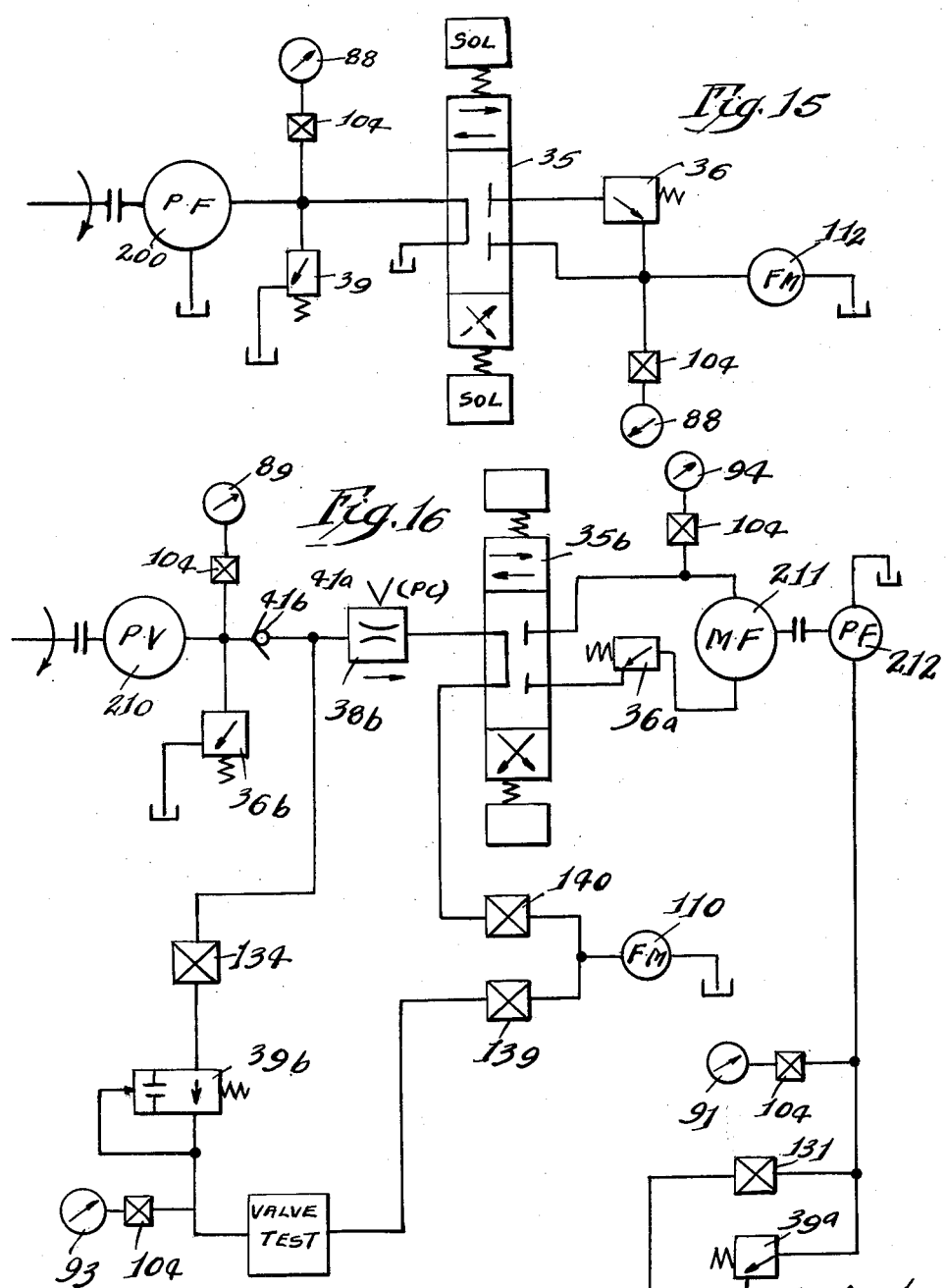

United States Patent Office 3,099,163
Patented July 30, 1963

3,099,163
HYDRAULIC FUNCTION ANALYZER
Robert E. Raymond, Zanesville, Ohio, assignor to Racine Hydraulics and Machinery, Inc., a corporation of Wisconsin
Filed May 17, 1960, Ser. No. 29,650
13 Claims. (Cl. 73—168)

This invention relates to hydraulic test equipment and more particularly to a function analyzer which accomplishes a wide variety of hydraulic tests accurately and without the need for complex tubing and machining setups and which has versatility to take care of circuit and/or condition changes.

Currently, there are two types of hydraulic test equipment available, one of which is a component type of test equipment which tests flow meters, pressure gauges, and other items. Secondly, there is a complete test unit for a specific purpose which incorporates sufficient devices for creating hydraulic power and loads and means for measuring pressure flow, power and other characteristics in a package form. These units have use in the purpose for which they were designed; however, they are not versatile in taking care of changed or future test requirements since there may be changes in equipment to be tested or types of tests to be run on the equipment.

The analyzer disclosed, herein, incorporates standard components in a unique and encompassing way in order to accomplish a wide variety of hydraulic tests and thus is adapted to the increasing use of complex hydraulic systems and provides the flexibility needed in meeting changes and new designs in the most standard types of hydraulic product.

An object of this invention is to provide a versatile hydraulic test analyzer in which changes can be quickly made in the circuit or conditions provided in the test and which provides for the use of many different circuits and simultaneous performance of different tests.

Another object of the invention is to provide a test analyzer having a functional valving section and a transfer section as well as an instrument section with all of these sections having fluid port connections of a uniform size located in the same general vicinity whereby patch board type of conduit connections may be made between the different parts by the use of tubing or flexible hoses with additional connections being made to a fluid pump, motor or valve mounted on the bed of the unit.

Another object of the invention is to provide an analyzer as defined in the preceding paragraph in which the functional valving includes relief and sequence valves, reducing valves, flow control valves, and check valves whereby many different typical hydraulic valving situations may be derived and these valves may be placed at different parts of a circuit through suitable connections to the transfer section, and the instrument section includes pressure gauges and flow meters with placement of a flow meter or pressure gauge in different parts of a circuit by suitable connections through the transfer section.

Another object of the invention is to provide a hydraulic function analyzer having a function board with the functional valving for the analyzer, an instrument board having the necessary instruments for the analyzer, a transfer board for connecting circuit points and having suitable manually operable valves for this purpose, a power board for connecting the analyzer to external sources of fluid power, a plurality of manifold blocks with fluid connections to the valves at the function board and to the instrument board, and a group of the manifold blocks at the transfer board, the manifold blocks having the same size of fluid ports and being generally located at one side of the analyzer whereby fluid connections between various manifold blocks may be quickly and selectively set up to connect certain valves and instruments into the circuit.

Another object of the invention is to provide a test analyzer as defined in the preceding paragraph in which at least some of the manifold blocks have dual port connections whereby jumpers may be connected therebetween to provide for parallel operation and thus increase the capacity of the analyzer and thus have low flow components suitable for handling high flow high pressure fluid.

Further objects and advantages will become apparent from the following detailed description taken in connection with the accompanying drawings in which:

FIG. 1 is a front elevational view of the hydraulic function block analyzer;
FIG. 2 is a rear elevational view of the hydraulic function block analyzer;
FIG. 3 is a side elevational view looking toward the right-hand end of FIG. 1;
FIG. 4 is a partial schematic diagram of the left-hand part of the hydraulic circuit embodied in the invention with a test circuit shown in broken line;
FIG. 4A is a partial schematic diagram of a center part of the hydraulic circuit embodied in the invention with distinct test circuits shown in dotted and broken line;
FIG. 5 is a partial schematic diagram of the right-hand part of the hydraulic circuit embodied in the invention with a test circuit shown in broken line wherein FIGS. 4, 4A, and 5 taken together have circuit parts generally arranged the same as viewed in FIG. 1 of the drawings;
FIG. 6 is a vertical fragmentary section taken generally along the line 6—6 in FIG. 1;
FIG. 7 is a detail side elevational view of a manifold block utilized in conjunction with the function board and the transfer board;
FIG. 8 is a front elevational view of the manifold block shown in FIG. 7;
FIG. 9 is a front elevational view of a detail of a manifold block utilizable with instruments on the instrument board;
FIG. 10 is a bottom plan view of the manifold block shown in FIG. 9;
FIG. 11 is a horizontal section taken through a power board generally along the line 11—11 in FIG. 2;
FIG. 12 is a horizontal section through a power board taken generally along the line 12—12 in FIG. 2;
FIG. 13 is a horizontal section taken through a power board generally along the line 13—13 in FIG. 2;
FIG. 14 is a horizontal section through another power board taken generally along the line 14—14 in FIG. 2;
FIG. 15 is a schematic diagram of a circuit for testing a pump and is shown in dotted line in FIGS. 4 and 4A; and
FIG. 16 is a schematic diagram of a circuit for testing a fluid motor and at the same time performing a particular valve test with the circuit being indicated in broken line in FIGS. 4A and 5.

While this invention is susceptible of embodiments in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown generally in FIGS. 1, 2 and 3, the test analyzer embodies a framework which supports a plurality of "boards." A function board, indicated generally at 10, is located at the lower front of the analyzer and has all of the functional valving associated with the unit. As shown in FIG. 1, the function board is comprised of three panel sections 11, 12 and 13, each of which has similar valves and thus provides duplicate valving.

An instrument board, indicated generally at 15, has a group of gauges visible to the front of the analyzer and in a generally out-of-the-way position as supported by a plurality of instrument panels 16, 17, and 18. Additionally, wing panels 19 and 20 have flow meters for measuring fluid flow.

A transfer board indicated generally at 21 constitutes a means for immediately connecting circuit points without disconnecting power lines and has a series of manually operable needle valves of the modulating type, which are arranged for easy operation from the front of the unit. A plurality of power boards, 22, 23, 24 and 25 are provided for receiving inputs to and outputs from the analyzer with the power boards 22 and 23 being provided for high volume fluid flow and power boards 24 and 25 for low volume fluid flow. As is readily apparent from FIG. 2 and as will more fully be described hereinafter, the entire rear of the analyzer constitutes a location in which various connections may be made between gauges, flow meters, valving and external connections to the analyzer by means of readily connectable jumpers, one of which is shown at 26 in FIG. 3, whereby characteristics such as pressure, load and power of motors, pumps and valves may be analyzed with changes in the circuit or conditions which require a high degree of versatility. The jumpers 26 constitute conduits formed of piping or preferably flexible hose.

In order to render the valves in the function board more universally usable, each of these valves has at least one associated manifold block of the type shown in FIGS. 7 and 8 with the manifold blocks being located at the lower rear section of the analyzer as shown in FIGS. 2 and 3 and with suitable flexible hose connections 30 extending between a manifold block 31 and a valve at the function board. A sufficient loop in the hose is provided to permit outward movement of the function board panels 11, 12 and 13 without disconnection of the hoses 30. In further description of the function board and its associated manifold blocks 31, reference may additionally be had to the schematic diagrams appearing in FIGS. 4, 4A and 5 which show the orientation of the function board valves and other components the same as in FIG. 1.

Each of the function board panels 11, 12 and 13 have similar valve arrangements and include a four-way valve 35, a relief-sequence valve 36, a pair of flow control valves 37 and 38, another relief-sequence valve 39, and a pressure reducing valve 40. Similar valves located on the panel 12 are identified by the same reference numeral, with the sub-letter "*a*" associated therewith, and similar valves on function board panel 13 are identified with the same reference numeral and the sub-letter "*b*" affixed thereto. Additionally, there is a check valve 41, 41*a* and 41*b* associated one with each of the panels. Each of the manifold blocks 31 has a pair of tapped ports 42 and 43 which communicate with a central passage 44 having a capped end 45. The side of the manifold block opposite that having the ports 42 and 43 has a port 46 communicating with the central passage 44 providing a connection for a flexible hose 30. The ports 42, 43 and 46 are threaded to receive "Flodar" self-coined metal to metal seal, straight thread hydraulic fittings. The ports 42 and 43 in the manifold block 31 provide for parallel operation whereby two hoses may connect into these ports to permit high fluid flow while still using relatively small hoses. These connections also permit connection together of multiple valves for increasing valve capacity. As illustrative of the manifold block relationship with the valves on the function board, the manifold blocks and their association with respect to the valves on valve function board panel 11 is described hereinafter. The upper row of manifold blocks 50 to 56, inclusive, has blocks 50, 51, 52, and 53 connected by hoses 30 to the ports of the four-way valve 35, while the remaining manifold blocks 54, 55 and 56 are connected to the ports of the relief-sequence valve 36. In the second row of manifold blocks identified by reference numerals 57 to 63, the blocks 57, 58 and 59 are connected to the ports of the flow control valve 37 and the block 60 is connected to the outlet of the check valve 41. Manifold blocks 61, 62 and 63 are connected to the ports of the flow control valve 38. In the third row of manifold blocks identified by reference numerals 64 to 70, the blocks 64, 65 and 66 are connected to the ports of the relief-sequence valve 39 and the manifold block 67 is connected to the inlet side of the check valve 41. The manifold blocks 68, 69 and 70 are connected to the ports of the pressure reducing valve 40. As is evident from FIGS. 4, 4A and 5, a similar connection is made between manifold blocks of the function board panels 12 and 13 to the valves carried on the panels. This similar arrangement is identified by similar reference numerals with the sub-letters "*a*" and "*b*" affixed thereto, respectively.

The manifold blocks 31 for connection to the valves of the function board 10 are each carried on panels 71, 72 and 73 which are supported from the lower part of the frame of the analyzer and the front panels 11, 12 and 13 of the function board are attached to the same frame by bolts 74 to prevent removal.

The instrument board 15 has a series of pressure gauges 80 and 97, inclusive, arranged in a generally horizontal row at the upper level of the analyzer for being readily visible to an operator standing in front of the unit, and each of the gauges has a piping connection 98 to one of several alike manifold blocks 99, as more particularly shown in FIGS. 9 and 10. Each of the blocks 99 has a pair of ports 100 and 101 for separate connection to a pair of the pipes 98 and each of these ports connects with intersecting ports 102 and 103, respectively, of the same size as ports 42 and 43 whereby suitable hose with straight thread hydraulic fittings may be selectively fastened into the ports 102 and 103. Each of the pipes 98 connecting a manifold block 99 to a pressure gauge has a damping needle valve 104 (FIGS. 3, 4, 4A and 5) connected thereto for gauge damping and these needle valves each have a manually engageable handle 105 extending to the front of the analyzer unit for manual setting of the needle valve (FIG. 1). The instrument board 15 additionally includes the wing panels 19 and 20 previously referred to, each of which has temperature and wattage meters 106 and 107. Additionally, flow meters are supported on these panels, with additional flow meters mounted on panels 108 and 109 of the transfer board. These flow meters are indicated at 110, 111, 112 and 113 with the flow meters 110 and 111 for handling relatively low flow and the flow meters 112 and 113 for handling relatively high flow.

The capacity of these flow meters is indicated in a relative manner by the size of the hydraulic fitting connections for the flow meters, with the connections 114 for the high volume flow meters extending to the rear of the analyzer (FIG. 2) and being of a size greater than the ports 115 for the flow meters 110 and 111.

The transfer board embodies the panels 108 and 109 previously referred to, as well as a central panel 120 which are interconnected together and supported from upstanding frame members 121 and 122. As stated previously, the transfer board is essentially a means for immediately connecting circuit points without disconnecting power lines and thus is located at a convenient location and height for an operator and has primarily a series of vertical rows of interconnected needle valves of the modulating type with these needle valves being indicated from 123 to 143, inclusive. Each of these needle valves is manually operable by a handle 144 associated therewith. Piping extending rearwardly from the needle valves connects opposite sides of each needle valve with a pair of manifold blocks 31 of the type shown in FIGS. 7 and 8 and thus one or more of the needle valves can be connected into the circuit by having suitable and selected hose connections to certain of the ports 42 and 43 of the manifold blocks 31. It should be noted that any of the ports 42 and 43 in any of the manifold blocks 31 associated with either the function board valves or the needle valves of the transfer board have their openings blocked by suitable caps when there is no hose connected thereto. It will be seen that with the needle valves 123 to 143, inclusive, arranged in several vertical rows, that the opening of all the needle valves in a row would connect together all of the ports 42 and 43 in the manifold blocks 31 in the row. One hose jumper connection 26 between any two vertical rows of manifold blocks 31 would connect two vertical rows and all points on these two rows could be connected together by opening all the needle valves in the two rows. Conversely, certain parts could be isolated and switched to other experiments by specific arrangement of jumper connections at the rear of the unit to facilitate control from the transfer board.

The power boards 22, 23, 24 and 25 are located at the rear of the analyzer with the lower power boards 24 and 25 being of the same construction and illustrated in cross section in FIG. 14. These power boards are provided with series of separate groups of ports 150, 151 and 152 with each group being connected by a lateral passage 153. The ports 150, 151, and 152 are all of the same size as ports 42 and 43 and are provided with straight thread connections for connection to conduits 26. The power boards 22 and 23 are also supported from the framework of the analyzer unit and are provided for high flow capacity and have distinct groups of ports as illustrated in FIGS. 11, 12 and 13 illustrating the different arrangements. It is a characteristic of the power boards 22 and 23 that there are conduit fittings of two different sizes whereby two different sizes of hose may be connected thereto. As shown in FIG. 11, one level of the power board has a small port 155 and a large port 156 connected by an internal passage 157. As shown in FIG. 12, there are two large ports 158 and 159 and a small port 160 connected by a central passage 161. In FIG. 13, there is one small port 162 and two small ports 163 and 164 connected by a central passage 165. The ports 155, 160, 163 and 164 are of the same size as the ports 42 and 43 in the manifold block 31, whereby the connections may be made simply between the power boards and manifolds. All power lines coming in from pump power supplies or reservoirs are terminated at the power boards on the analyzer. Return lines with high flow capacity can utilize the port openings such as 158 and 162 in the power boards 22 and 23, while small line flows may be summed by use of a connection such as shown in FIG. 13 in which two hoses can connect into the ports 163 and 164 with a separate line connected to port 162.

The frame supports a bed 170 having T-slots at the upper surface thereof for simple attachment of parts undergoing test thereto and the transfer board having the panels 108, 109, and 120 is located in spaced relation above the bed whereby a free space is provided between the frame members 121 and 122. Hose connections may extend from components on the bed through said space back to connection with various manifold blocks at the rear of the unit.

With the foregoing structure as described herein, it is possible to utilize selective and quickly changeable conduit connections between component functions, test instruments and loads. All hydraulic connections are arranged into one area at the rear of the unit with standardized hose connections making it convenient to quickly connect between two hydraulic functions rapidly without leakage and circuit design problems. With the transfer of functions as obtained by utilization of the transfer board 21, it is possible to switch various valve functions provided by the valves on the function board 10 into the circuit. As an example, one of the relief valves 41 on the function board 10 can be used to either control pump pressure, exert back pressure on a cylinder as a resistance valve or determine pilot pressure. In addition to this, one can switch from a relief valve to a reducing valve as the case may require through the shift of needle valves on the transfer board 21 once the proper conduit connections have been made at the rear of the unit.

In order to summarize the construction disclosed herein, reference may be had to FIGS. 15 and 16 schematically illustrating two different arrangements that can be obtained. The arrangement shown in FIG. 15 is illustrated in actual conduit connections by dotted line in FIGS. 4 and 4A and the arrangement shown in FIG. 16 is illustrated in broken line in FIGS. 4A and 5.

The test set up shown in FIG. 15 indicates a possible simple pump test for determining volumetric efficiencies under various loads with regards to no load flow. In this test, a fixed displacement pump 200 is driven from an electric motor 201 having the power supplied thereto indicated by the watt meter 107 and the pump is connected into a port 152 of the power board 25. Connections extend from the ports 150 and 151 of power board 25 to the relief-sequence valve 39 and the four-way valve 35 by means of the function board manifold blocks 64 and 51, respectively. The relief-sequence valve has its manifold blocks 65 and 66 connected to a port 150 of the power board 25 and from there to a small port 160 of the power board 23 which has a large port 159 connected to tank. The four-way valve 35 has its discharge port connected to manifold block 52 which is connected into a port 151 of the power board 25 which then directs fluid through the same line to the power board 23 for discharge to tank. The power ports of the four-way valve 35 are connected to manifold blocks 50 and 53, respectively, with a line from manifold block 50 connected into the power board 25 at one level which then transfers to another level of the power board with one line at the latter level of the power board leading to a port 114 of the flow meter 112. The outlet end of the flow meter port 114 connects through a line into the power board 23 which through connections between three levels of the power board 23 directs fluid to tank. The other line leading from the same level of the power board 25 connects to a manifold block 56 connected to the relief-sequence valve 36 and also to the manifold block 55 which connects to the valve 36. The manifold block 54 also connected to the valve 36 is connected to the manifold block 53 which is connected to the other power port of the four-way valve 35. Both ports 42 and 43 of the manifold block 51 are utilized with one having been previously described, and the other having a line connected to the manifold block 31 at the transfer board which is immediately beneath the needle valve 125 and the other port of the same manifold block has a line connecting into the pressure gauge 88. One additional line connects from the power board 25 at the same level as the connection extending to the manifold block 50 with the line extending to the pressure gauge 87. In this test the four-way valve is used for switching the output of the pump to either a resistance load or no load through the flow meter which in each instance gives a convenient way of testing a pump output. First, the pump is put through the flow meter at relatively no pressure and the flow rate observed at the output of the pump. Then, by shift of the four-way valve, flow is directed through the valve 36 functioning as a resistance valve which loads the pump at a certain determined pressure for recording flow rates under these conditions.

The second test arrangement as shown in FIG. 16 is illustrated in broken line in FIGS. 4A and 5 and discloses a test in which fluid motors are analyzed and a particular valve test is going on at the same time. In this test, a variable displacement pump 210 is connected into the power board 24. The valve 36b is used as a maximum pressure safety relief and the gauge 89 is used to indicate pressure of fluid delivered from the pump. The flow of fluid passes through the check valve provided by check valves 41a and 41b and the flow control valve 38b is used to determine the speed of a fluid motor through the four-way valve 35b. At the output side of the four-way valve, one line connects to a fluid motor 211 at one side through a resistance valve provided by the valve 36a and the other side of the motor has a pressure gauge 94. The motor 211 is connected to a loading pump 212 to hydraulically load the fluid motor. The load pump 212 has a pair of valves which alternately load or unload the pump with the shut off valve 131 being provided by a needle valve on the transfer board and the resistance valve being provided by the valve 39a on the function board. This line has its pressure indicated by the gauge 91. The flow in the motor test circuit is indicated by the flow meter 110 of the instrument board. Alternate use of this flow meter is determined by use of shut off valves provided by the needle valves 139 and 140 on the transfer board which determine whether the flow meter is connected into the motor test or the valve test, subsequently to be described. In the test of the fluid motor, the flow meter is an indication of the speed thereof. Volumetric slip in the fluid motor would be measured in the flow meter.

In the valve test, the operation thereof is controlled by a shut off valve 134 which is one of the needle valves on the transfer board and the flow to the valve test passes through a reducing valve constituted by the valve 39b of the function board with the flow line to the valve test having its pressure indicated by the gauge 93. The output side of the valve test connects through the shut off valve 139 to the flow meter 110.

In the valve test, the test can analyze the test of pressure drops, leakage flow, or similar tests, at reduced pressures.

I claim:
1. An hydraulic function analyzer for analyzing characteristics of hydraulic components comprising, a function board having a plurality of function valves, an instrument board having a plurality of instruments, a transfer board having means defining a plurality of distinct fluid flow paths with an on and off valve connected in each of said paths intermediate the ends thereof, a power board having a plurality of internally flow connected fluid ports, and a plurality of manifold blocks located in the same general area removed from said transfer and function boards, there being an individual manifold block for each of said instruments and each of said valves, a flow connection between a block and its respective valve or instrument, and a group of said blocks associated with the transfer board, said group of blocks including blocks connected in said flow paths of the transfer board at either side of said on and off valve, and conduits for selectively and releasably connecting a manifold block to the power board or an element under test and a plurality of manifold blocks together to place the desired valves and instruments in circuit.

2. An hydraulic function analyzer for analyzing characteristics of hydraulic components comprising, a function board having a plurality of function valves, an instrument board having a plurality of instruments, a transfer board having means defining fluid flow paths with flow controlling valving connected therein, and a plurality of manifold blocks with the same size fluid ports located in the same general area removed from said transfer and function boards, there being an individual manifold block for each of said instruments and each of said function valves with flow connections therebetween and a group of said blocks associated with the transfer board, and conduits for selectively and releasably connecting a manifold block to an element under test, a source of power or a plurality of manifold blocks together.

3. An hydraulic function analyzer as defined in claim 2 in which all of the manifold blocks for the valves and the transfer board are provided with dual port connections for said conduits whereby two or more blocks can be connected in parallel to provide high capacity circuits to permit high flow of fluid.

4. An hydraulic analyzer comprising, a frame, a lower front panel on the frame, a plurality of function valves mounted on said lower front panel, a second panel on said frame generally above said lower panel, a plurality of manually operable valves on said second panel having their operating handles engageable from the front of the frame, an upper panel above said second panel and having a plurality of indicating instruments supported thereon, a lower rear panel having a plurality of function manifold blocks, a flow line for each of said manifold blocks extending to said lower front panel and connected to one of the function valves supported on the last mentioned panel, a plurality of transfer manifold blocks supported at the rear of said transfer board, piping interconnecting said last mentioned blocks in rows with one of said manually operable valves in circuit between a pair of transfer manifold blocks, an instrument manifold block at the rear of the frame for each instrument, all of said manifold blocks having fluid ports enabling releasable and selective interconnection of suitable blocks by conduits positioned at the rear of the frame or connection to power sources or an element or elements under test.

5. An analyzer as defined in claim 4 in which a component supporting surface is located above said lower front panel, and said second panel is spaced thereabove to provide an opening from front to rear of the frames at the height of said supporting surfaces for connection of a manifold block to an element under test.

6. An analyzer as defined in claim 4 in which a wing panel is attached to said frame adjacent said second panel for carrying auxiliary test equipment.

7. An hydraulic analyzer comprising, a frame, a plurality of function valves mounted at the front of said frame, a plurality of manually operable valves on said frame having their operating handles engageable from the front of the frame, a plurality of function manifold blocks, a flow line for each of said manifold blocks connected to one of said function valves, a plurality of transfer manifold blocks supported at the rear of said frame, piping interconnecting said last mentioned blocks in rows with one of said manually operable valves in circuit between a pair of transfer manifold blocks, all of said manifold blocks having fluid ports enabling releasable and selective interconnection of suitable blocks by conduits positioned at the rear of the frame.

8. An analyzer as defined in claim 7 in which some of said transfer and function manifold blocks have dual port connections to permit parallel operation.

9. An hydraulic analyzer comprising, a plurality of function valves, a plurality of manually operable transfer valves, a plurality of transfer manifold blocks, piping interconnecting said last mentioned blocks in rows with one of said manually operable valves in circuit between a pair of transfer manifold blocks, a panel having a plurality of indicating instruments supported thereon, an instrument manifold block for each instrument, a plurality of function manifold blocks each connected individually to one of said function valves, all of said manifold blocks being located in one area of the analyzer and having fluid ports enabling releasable and selective interconnection of suitable blocks by releasable conduits.

10. An hydraulic analyzer comprising, a frame, a removable lower front panel at the front of the frame, a plurality of function valves mounted on said lower panel, an upper panel having a plurality of indicating instruments supported thereon, a power board having a plurality of ports for supplying fluid to said function valves, a lower rear panel having a plurality of function valve manifold blocks, a flexible hose for each of said manifold blocks extending to said lower front panel and connected to a valve supported on the last mentioned panel, an instrument manifold block at the rear of the frame for each instrument, all of said manifold blocks having fluid ports enabling releasable and selective conduit interconnection of suitable blocks and conduit connection to the power board.

11. An analyzer as defined in claim 10 in which said power board is mounted to the frame at the side thereof and said flexible hoses are of a length sufficient to permit movement of said lower front panel from the frame without disconnecting said flexible hoses.

12. An analyzer as defined in claim 10 in which said power board ports are arranged in groups with each group internally flow connected and at least one port in some of the groups being of a size different than the remainder.

13. An analyzer for analyzing characteristics of various motors, pumps and valves and readily permitting imposition of changes in circuit and conditions comprising, a plurality of function valves, a plurality of adjacent similar function manifold blocks connected one to each of said function valves to establish a uniformity in size of connecting ports, a plurality of indicating instruments each having a manifold block with a port, a group of adjacent transfer manifold blocks arranged in rows, a plurality of flow controlling valves located one in between a pair of transfer manifold blocks, said function and transfer manifold blocks having fluid ports of the same size and located to have unobstructed space therebetween whereby conduit connection may be releasably and selectively made between manifold blocks.

References Cited in the file of this patent

UNITED STATES PATENTS

| | | |
|---|---|---|
| 2,478,938 | Osterhus | Aug. 16, 1949 |
| 2,568,535 | Ballard | Sept. 18, 1951 |
| 2,612,777 | Greer | Oct. 7, 1952 |
| 2,924,971 | Schroeder et al. | Feb. 16, 1960 |

FOREIGN PATENTS

| | | |
|---|---|---|
| 1,225,891 | France | Feb. 22, 1960 |
| 233,490 | Australia | Apr. 11, 1961 |